United States Patent
Chiu

(10) Patent No.: US 6,748,208 B2
(45) Date of Patent: *Jun. 8, 2004

(54) METHOD OF TRANSMISSION FOR RADIO MONITORING VIA DIGITAL MOBILE COMMUNICATION NETWORK AND APPARATUS THEREFOR

(75) Inventor: Hung-Che Chiu, Taipei (TW)

(73) Assignee: Mitake Information Corporation, Taipei (TW)

( * ) Notice: Subject to any disclaimer, the term of this patent is extended or adjusted under 35 U.S.C. 154(b) by 394 days.

This patent is subject to a terminal disclaimer.

(21) Appl. No.: 09/800,726

(22) Filed: Mar. 8, 2001

(65) Prior Publication Data

US 2002/0127996 A1 Sep. 12, 2002

(51) Int. Cl.[7] .................................. H04M 1/66
(52) U.S. Cl. .................... 455/410; 455/420; 455/9; 455/67.11; 381/26; 381/56; 379/133
(58) Field of Search .................... 455/115.1, 115.2, 455/115.3, 420, 9, 557, 67.11, 67.13, 550.1, 411, 410; 381/26, 56, 311; 379/32.01, 38, 100.05, 106.02, 114.01, 133

(56) References Cited

U.S. PATENT DOCUMENTS

| | | | |
|---|---|---|---|
| 4,571,455 A | * 2/1986 | Labock et al. | 379/40 |
| 5,367,560 A | * 11/1994 | Watanabe et al. | 379/72 |
| 5,402,475 A | * 3/1995 | Lesner et al. | 379/106.11 |
| 5,887,051 A | * 3/1999 | Sullivan et al. | 379/21 |
| 6,006,109 A | * 12/1999 | Shin | 455/557 |
| 6,128,370 A | * 10/2000 | Barazesh et al. | 379/31 |
| 6,240,303 B1 | * 5/2001 | Katzur | 455/563 |
| 6,580,929 B1 | * 6/2003 | Chiu | 455/573 |

* cited by examiner

Primary Examiner—Charles Appiah
Assistant Examiner—Nghi H. Ly
(74) Attorney, Agent, or Firm—Rosenberg, Klein & Lee

(57) ABSTRACT

In a method of transmission for radio monitoring via digital mobile communication network, a digital cellular mobile phone with keypad, display and buzzer removed therefrom is used as an apparatus to achieve the radio monitoring. A high-sensitivity audio amplification circuit is added to a microphone in the digital cellular mobile phone and a DTMF decoding IC is added to an incoming call loop of the phone, so that the phone is able to automatically receive an incoming call and send a warning sound to prompt the caller to input a password via keys on the calling phone. The digital cellular mobile phone uses the DTMF decoding IC to verify the input password within a preset time period and enables the high-sensitivity audio amplification circuit to pick up sounds in surrounding field when the input password is verified as correct. Sounds picked up are then transmitted to the caller via the currently available digital cellular mobile phone system to achieve a field monitoring.

4 Claims, 4 Drawing Sheets

METHOD OF TRANSMISSION FOR RADIO MONITORING VIA DIGITAL MOBILE COMMUNICATION NETWORK AND APPARATUS THEREFOR

BACKGROUND OF THE INVENTION

The present invention relates to a method of transmission for radio monitoring via a digital mobile communication network, and more particularly to a method of transmission in which a digital GSM mobile communication system or a DCS mobile communication system is used as a transmission medium to achieve a field monitoring from a remote position. The present invention also relates to an apparatus for such transmission.

A conventional radio monitoring equipment for security and anti-theft purpose uses radio transmission to achieve a field monitoring from a remote position. A disadvantage of such conventional radio monitoring equipment is that only a limited monitoring distance within the range from 50 M to 500 M is available based on the radio frequency power for such equipment. Moreover, since such conventional radio monitoring equipment is analog transmission equipment, the transmission thereof is easily intercepted by other detection equipment. Therefore, such conventional radio monitoring equipment is not ideal in terms of the practical application effect thereof.

SUMMARY OF THE INVENTION

It is a primary object of the present invention to provide a method of transmission for radio monitoring via currently available digital mobile communication network, and a transmission apparatus for such purpose. In the method of the present invention, a digital transmission network supporting the currently available GSM mobile communication system or DCS mobile communication system is used as a medium to achieve a field monitoring from a remote position, so as to eliminate drawbacks existing in the conventional radio monitoring equipment, such as having limited monitoring distance and being subjected to interception.

The transmission apparatus of the present invention achieves the above object by adding a high-sensitivity audio amplification circuit to a mobile phone to facilitate picking up of a sound source.

The mobile phone serving as the transmission apparatus of the present invention for achieves the above object also has a DTMF decoding IC added to an incoming call loop in the mobile phone. The DTMF decoding IC reads out a DTMF code input by a caller via keys on a calling phone and verifies whether the input DTMF code is a correct password.

The mobile phone serving as the transmission apparatus of the present invention for achieves the above object also has a CPU provided with an automatic answering element for the phone to automatically answer an incoming call and send a warning sound to prompt the caller to input a password.

In the method of the present invention, the high-sensitivity audio amplification circuit is enabled only when an input password by a caller is verified as correct, in order to ensure a confidential field monitoring.

The transmission apparatus of the present invention uses a digital mobile communication system, such as GSM, CDMA, PHS, DCS or other similar system, as a transmission medium thereof, and uses DTMF decoding to control whether a caller is permitted to enable the pick-up device in the apparatus. Therefore, keypad, display and buzzer provided in regular mobile phone are removed from the transmission apparatus of the present invention.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
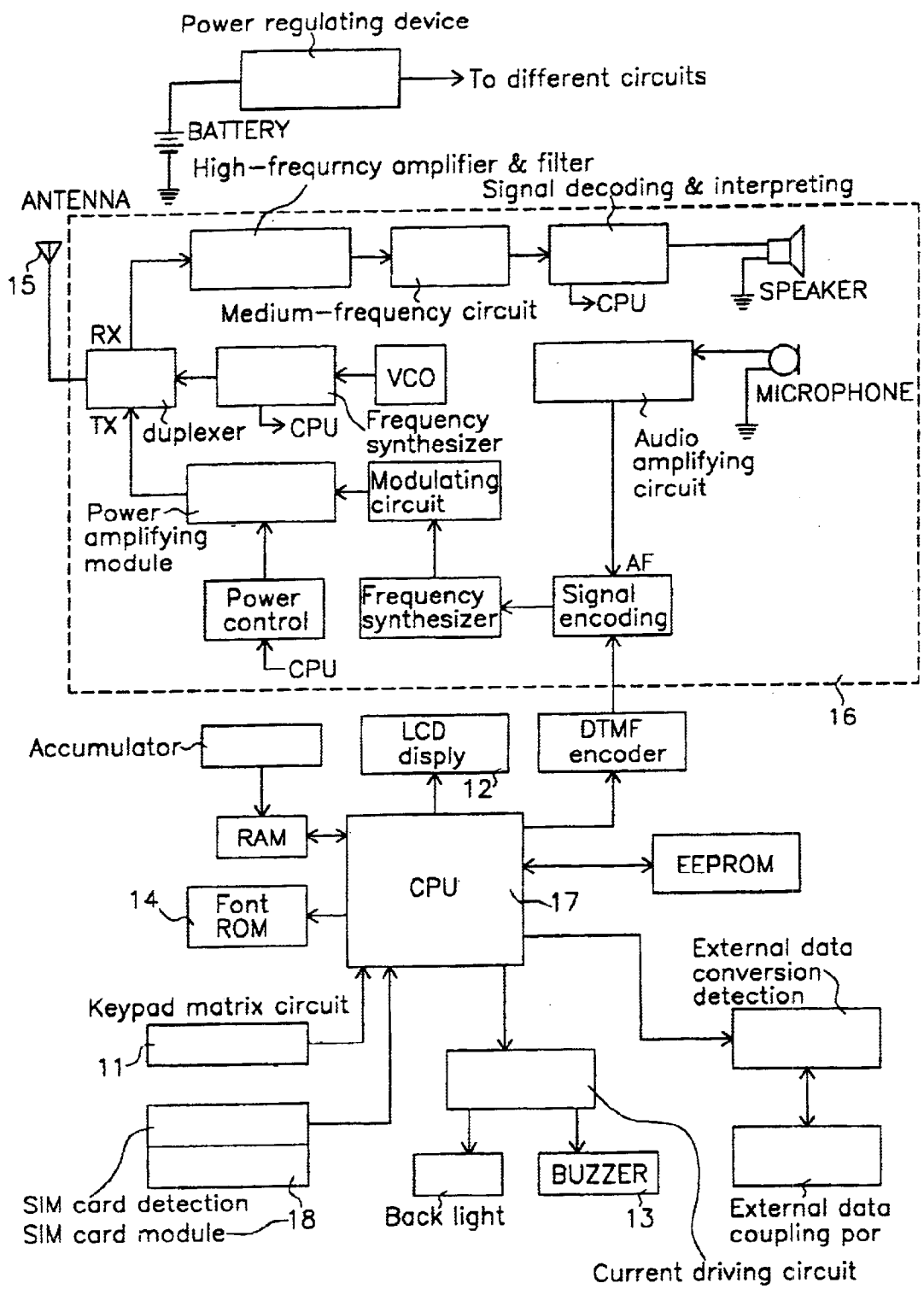
FIG. 1 is a block diagram of a circuit for a conventional standard GSM mobile phone.
Figure 2:
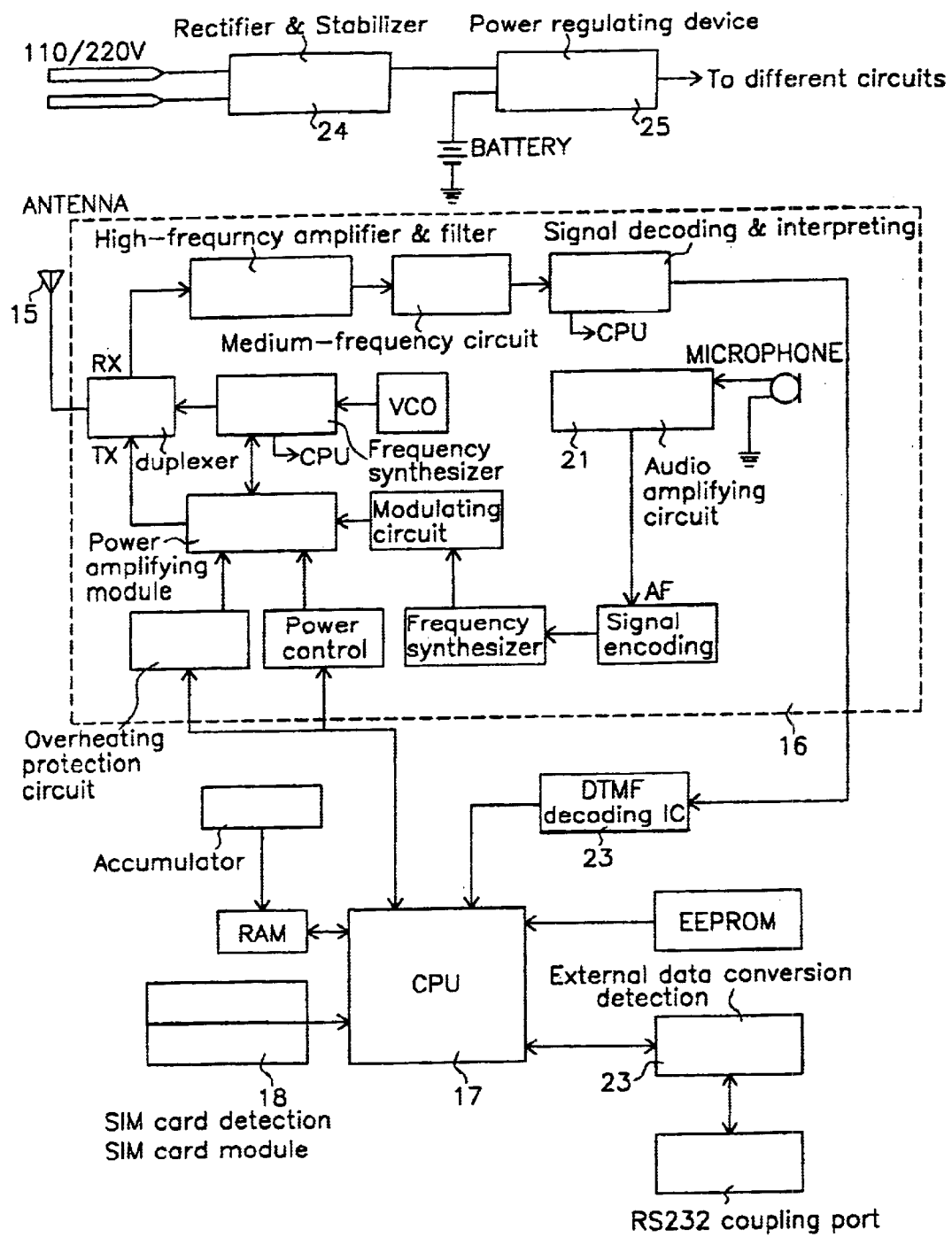
FIG. 2 is a block diagram of a circuit for an apparatus for radio monitoring according to the present invention.

Please refer to FIGS. 1 and 2 at the same time. FIG. 1 is a block diagram of a circuit for a conventional standard GSM mobile phone, and FIG. 2 is a block diagram of a circuit for an apparatus for radio monitoring according to the present invention. From a comparison of FIG. 1 with FIG. 2, it can be found that a keypad 11, a liquid crystal display (LCD) 12, a buzzer 13, and a font read-only memory (ROM) 14, that are external interfaces for a conventional standard mobile phone supported by Global System for Mobile (GSM), are omitted from the apparatus of the present invention. Other parts of the GSM mobile phone, such as an antenna 15, a transceiver module 16, a central processing unit (CPU) 17, and a Subscriber Identity Module (SIM) card slot 18, are kept for the apparatus of the present invention. Thus, the apparatus of the present invention is basically a low-power radio frequency (RF) signal transceiver that complies with the mobile phone standards established by the GSM Union but with some changes in the interfaces thereof. That is, the apparatus of the present invention follows the standards established by the GSM Union with respect to functions such as SIM card, RF emitting power, digital signal encoding and interpreting, etc. With this principle, the apparatus of the present invention includes an open SIM card slot that enables the apparatus of the present invention to be normally connected to and registered in the GSM cellular communication service network after a SIM card is inserted into the SIM card slot, and then enter a normal standby mode. In other words, the apparatus of the present invention becomes workable only when a user of the apparatus inserts a SIM card into the SIM card slot in the apparatus. And, the user obtains the SIM card by purchasing it from a cellular communication service provider.

As shown in FIG. 2, the apparatus of the present invention includes a high-sensitivity audio amplification circuit 21 connected to a microphone that is usually provided in the conventional mobile phone for enhancing a pick-up sensitivity of the apparatus, and a DTMF decoding IC 22 added to an incoming call loop for reading out a DTMF code input by a caller through keys on a calling phone. When a SIM card is inserted into the SIM card slot in a mobile phone according to the apparatus of the present invention, the mobile phone can only be used to receive calls but not to send out calls, because the keypad has been omitted. The CPU 17 in the apparatus of the present invention functions to automatically receive signals of incoming calls. However, when an incoming call is received, the CPU 17 does not immediately enable the audio amplification circuit 21 but rather emits a warning sound to the caller to prompt the caller to input a password. The high-sensitivity audio amplification circuit 21 is enabled only when the caller inputs a correct password through keys on the calling phone within a preset time period, so that the caller could monitor from a remote position any sound in a field at where the apparatus of the present invention is provided.

Figure 3:
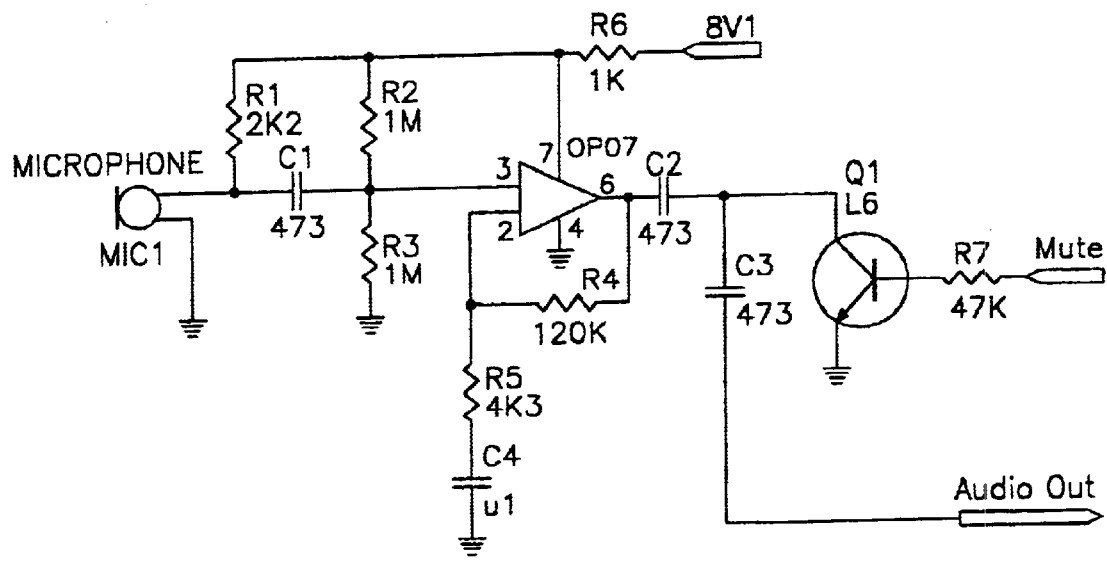
FIG. 3 is a circuit diagram for the high-sensitivity audio amplification circuit of the present invention.

Please refer to FIG. 3 that is a circuit diagram of the high-sensitivity audio amplification circuit 21 adopted in the present invention. As shown, the circuit 21 mainly includes an operation amplifier 0P07, an input of which is connected to a microphone MIC via a capacitor C1 so that an audio signal is pre-amplified by the operation amplifier 0P07. An output of the operation amplifier 0P07 is connected to a crystal Q1 that serves as a switch to enable or disable the audio amplification circuit 21.

Figure 4:
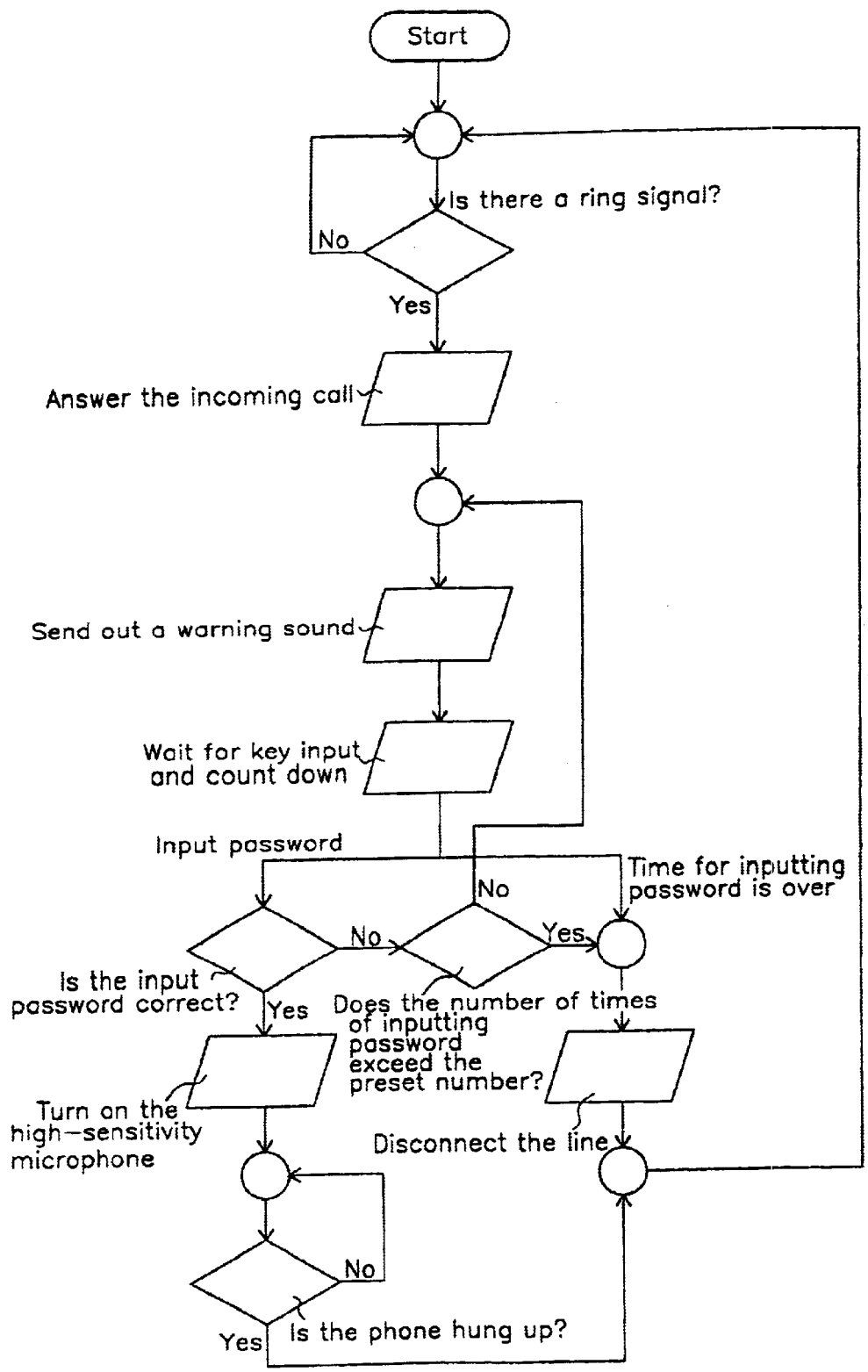
FIG. 4 is a flowchart showing operational procedures of the present invention.

Please refer to FIG. 4 that is a flowchart showing operational procedures of the apparatus of the present invention. When a ring signal of incoming call is detected, the apparatus of the present invention automatically answers the phone without enabling the audio amplification circuit 21 and emits a warning sound to prompt the caller to input a password. When the caller fails to input a correct password within a preset time period or inputs wrong passwords several times exceeded a preset number of times, the apparatus automatically disconnects the line. On the other hand, when the caller inputs the correct password within the preset time period, the high-sensitivity audio amplification circuit 21 is enabled to allow the caller to monitor from a remote position any sound in a field at where the apparatus of the present invention is provided.

A standard transmission method via a mobile phone established by the GSM Union is divided into two modes, namely, a regular transmission mode and a non-regular transmission mode or DTX mode. In the transmission method of the present invention, the regular transmission mode is set to obtain enhanced monitoring quality. That is because, when the DTX mode is set for transmission, an encoding rate of 13 Kbps is used to encode voice of a user talking over the mobile phone, and an encoding rate of 500 bps is used when no user talks over the mobile phone. The setting of DTX mode is advantageous to reduced power consumption but disadvantageously degrades the quality of radio monitoring. Therefore, unlike the commercially available standard GSM mobile phones, the apparatus of the present invention has a default value of OFF for TDX transmission mode.

Since the keypad has been removed from the mobile phone adopted as the apparatus of the present invention, setting of internal systems of the apparatus and alteration of password that is required for enabling the transmission method of the present invention are done through an external data input port 23 adapted to connect to, for example, a RS-232 communication interface on a computer.

The apparatus of the present invention may include two types, namely, an externally powered type and an AC & battery type. In the case the apparatus is to be frequently in a standby mode for a prolonged time, it may be connected to an external power source. In this case, an alternating current is caused to pass a voltage-down and rectifying device 24 before being sent to a power-regulating device 25. Since the apparatus of the present invention is simplified and not provided with the keypad, the display and the buzzer, it has a largely reduced volume and can therefore be disguised as a common electrical appliance or incorporated in some other electrical appliances, such as a multi-socket extension cord, an emergency lighting, an electronic alarm, etc. In this case, the apparatus of the present invention may be powered with the same power source for the electric appliance into which it is incorporated and can therefore be in the standby mode for a prolonged time to perform the field monitoring at any time.

In brief, the present invention uses a digital communication network as its transmission medium and thereby eliminates the limitation in distance during a sound monitoring as would otherwise occur when using the conventional sound monitoring equipment. Moreover, the present invention employs digital transmission instead of analog transmission and is therefore able to encode and encrypt all messages to prevent the encrypted messages from being intercepted by general detection equipment.

What is claimed is:

1. A method of transmission for radio monitoring via an apparatus supported by a digital mobile communication network, comprising steps of:

automatically answering a ring signal of an incoming call over said apparatus;

sending a warning sound to prompt a caller of said incoming call to input a password;

reading and verifying said password input by said caller within a preset time period; and enabling a high-sensitivity audio amplification circuit in said apparatus when said password input by said caller is verified as correct, so that said caller is permitted to perform a radio monitoring in a field at where said apparatus is located.

2. A method of transmission for radio monitoring via an apparatus supported by a digital mobile communication network as claimed in claim 1, wherein said apparatus for performing said radio monitoring is a digital cellular mobile phone without any keypad, display and buzzer that are otherwise provided on a regular cellular mobile phone.

3. A method of transmission for radio monitoring via an apparatus supported by a digital mobile communication network as claimed in claim 1, wherein said apparatus includes a DTMF decoding IC that decodes said password input by said caller.

4. A method of transmission for radio monitoring via an apparatus supported by a digital mobile communication network as claimed in claim 1, wherein said apparatus includes an external data input port adapted to connect to a communication interface provided on a computer, so that any alteration of said password and other settings for internal systems of said apparatus are done via said computer communication interface.

* * * * *